United States Patent
Suit

(10) Patent No.: US 8,656,219 B2
(45) Date of Patent: *Feb. 18, 2014

(54) SYSTEM AND METHOD FOR DETERMINATION OF THE ROOT CAUSE OF AN OVERALL FAILURE OF A BUSINESS APPLICATION SERVICE

(75) Inventor: John M. Suit, Mount Airy, MD (US)

(73) Assignee: Red Hat, Inc., Raleigh, NC (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/439,803

(22) Filed: Apr. 4, 2012

(65) Prior Publication Data

US 2012/0221898 A1    Aug. 30, 2012

Related U.S. Application Data

(63) Continuation of application No. 12/905,879, filed on Oct. 15, 2010, now Pat. No. 8,156,378.

(51) Int. Cl.
*G06F 11/00* (2006.01)

(52) U.S. Cl.
USPC .......................................................... 714/26

(58) Field of Classification Search
USPC ............................................................ 714/26
See application file for complete search history.

(56) References Cited

U.S. PATENT DOCUMENTS

| | | | |
|---|---|---|---|
| 6,513,059 B1 | 1/2003 | Gupta et al. | |
| 6,658,465 B1 | 12/2003 | Touboul | |
| 6,871,223 B2 | 3/2005 | Drees | |
| 7,624,172 B1 | 11/2009 | Austin-Lane | |
| 7,769,720 B2 | 8/2010 | Armington | |
| 7,793,162 B2 * | 9/2010 | Mock et al. | 714/47.1 |
| 7,890,318 B2 * | 2/2011 | Castellani et al. | 704/9 |
| 7,975,058 B2 | 7/2011 | Okmianski et al. | |
| 8,156,378 B1 * | 4/2012 | Suit | 714/26 |
| 8,185,442 B2 * | 5/2012 | Kiran Vedula | 705/26.1 |
| 8,234,377 B2 | 7/2012 | Cohn | |
| 8,295,277 B2 | 10/2012 | Vadlakonda et al. | |
| 2003/0177112 A1 | 9/2003 | Gardner | |
| 2004/0133672 A1 | 7/2004 | Bhattacharya | |
| 2005/0240606 A1 | 10/2005 | Edelstein | |
| 2005/0268298 A1 | 12/2005 | Hunt et al. | |
| 2006/0069768 A1 | 3/2006 | Wen et al. | |
| 2006/0074833 A1 * | 4/2006 | Gardner et al. | 706/45 |
| 2006/0195715 A1 | 8/2006 | Herington | |
| 2006/0230134 A1 | 10/2006 | Qian et al. | |
| 2007/0220121 A1 | 9/2007 | Suwarna | |
| 2009/0028053 A1 * | 1/2009 | Kannan et al. | 370/241 |
| 2009/0182880 A1 | 7/2009 | Inamdar | |

(Continued)

OTHER PUBLICATIONS

Red Hat Office Action for U.S. Appl. No. 12/905,565, mailed Oct. 2, 2012.
Red Hat Office Action for U.S. Appl. No. 12/905,645, mailed Sep. 13, 2012.
Red Hat Office Action for U.S. Appl. No. 12/905,688, mailed Oct. 4, 2012.
Red Hat Office Action for U.S. Appl. No. 12/905,761, mailed Oct. 22, 2012.
Red Hat Office Action for U.S. Appl. No. 12/905,879, mailed Jul. 8, 2011.

(Continued)

*Primary Examiner* — Amine Riad

(74) *Attorney, Agent, or Firm* — Lowenstein Sandler LLP

(57) ABSTRACT

An ontology is generated for a business application on an enterprise network that describes one or more nodes that communicate with each other during the execution of the business application. An alert condition of the business application is detected, and the ontology for the business application is processed to determine one or more components of the ontology that are in an alert state. Further, a root cause view that indicates the one or more alert state components is generated and displayed to a user.

22 Claims, 10 Drawing Sheets

(56) References Cited

U.S. PATENT DOCUMENTS

| | | |
|---|---|---|
| 2009/0204701 A1 | 8/2009 | Herzog et al. |
| 2009/0228579 A1 | 9/2009 | Sanghvi et al. |
| 2009/0228589 A1 | 9/2009 | Korupolu |
| 2009/0307772 A1 | 12/2009 | Markham et al. |
| 2010/0049731 A1* | 2/2010 | Kiran Vedula ................ 707/102 |
| 2010/0138390 A1 | 6/2010 | Lobo |
| 2010/0161604 A1* | 6/2010 | Mintz et al. .................... 707/736 |
| 2010/0287263 A1 | 11/2010 | Liu et al. |
| 2010/0318609 A1 | 12/2010 | Lahiri et al. |
| 2012/0096065 A1 | 4/2012 | Suit |
| 2012/0096134 A1 | 4/2012 | Suit |
| 2012/0096142 A1 | 4/2012 | Suit |
| 2012/0096143 A1 | 4/2012 | Suit |
| 2012/0096171 A1 | 4/2012 | Suit |

OTHER PUBLICATIONS

Red Hat Notice of Allowance for U.S. Appl. No. 12/905,879, mailed Dec. 8, 2011.

Red Hat Office Action for U.S. Appl. No. 12/905,565, mailed Apr. 11, 2013.

Red Hat Office Action for U.S. Appl. No. 12/905,645, mailed Mar. 26, 2013.

Red Hat Office Action for U.S. Appl. No. 12/905,761, mailed Apr. 11, 2013.

Red Hat Office Action for U.S. Appl. No. 12/905,850, mailed Dec. 6, 2012.

* cited by examiner

SYSTEM AND METHOD FOR DETERMINATION OF THE ROOT CAUSE OF AN OVERALL FAILURE OF A BUSINESS APPLICATION SERVICE

RELATED APPLICATIONS

This application is a continuation of U.S. patent application Ser. No. 12/905,879, filed Oct. 15, 2010, which is incorporated herein by reference.

CROSS-REFERNCE TO RELATED APPLICATIONS

This application relates to the Applicant's co-pending applications: Ser. No. 12/905,565 Fortisphere1: titled "System and method for identification of business process application service groups"; Ser. No. 12/905,645 Fortisphere2: titled "System and method for migration of network entities to a cloud infrastructure"; Ser. No. 12/905,688 Fortisphere3: titled "System and method for monitoring system performance changes based on configuration modification"; Ser. No. 12/905,761 Fortisphere4: titled "System and method for indicating the impact to a business application service group resulting from a change in state of a single business application service group node"; Ser. No. 12/905,850 Fortisphere5: titled "System and method for enterprise nodes that are contained within a public cloud to communicate with private enterprise infrastructure dependencies."

The entire contents of each of the above mentioned applications are specifically incorporated herein by reference.

FIELD OF THE INVENTION

Embodiments of the invention relate to systems and methods for managing enterprise networks and in particular to analyzing faults and errors at nodes within the network.

BACKGROUND

In a business network comprising a plurality of computing nodes, a network administrator is required to maintain the health of the network to ensure that business application services and processes are running correctly. When failures occur, the network administrator must diagnose the cause and take any necessary remedial actions. In many cases, a failure may be detected on one node when in actual fact, the fault is with another node that has a business process relationship with the node on which the fault has been detected. To take the correct action, it is therefore necessary to detect the root cause of the fault.

Traditionally, the root cause can only be detected by determining the "direct" cause and effect relationship between two or more enterprise nodes. If a node fails that has a direct dependency on another, it follows that the dependent will fail if dependency on the non-failing node requires an input or output requirement subsequent to the failure.

The method of monitoring for and performing analysis to determine the root cause of a failure based on a "direct" cause and affect relationship is insufficient because in many cases there may be no direct relationship between the root cause node and the node on which the fault has been detected. Thus, the network administrator may end up taking inappropriate remedial actions on one node, without remedying the fault on the root cause node.

BRIEF DESCRIPTION OF THE DRAWINGS

Reference will now be made, by way of example only, to specific embodiments and to the accompanying drawings in which.

DETAILED DESCRIPTION

Figure 1:
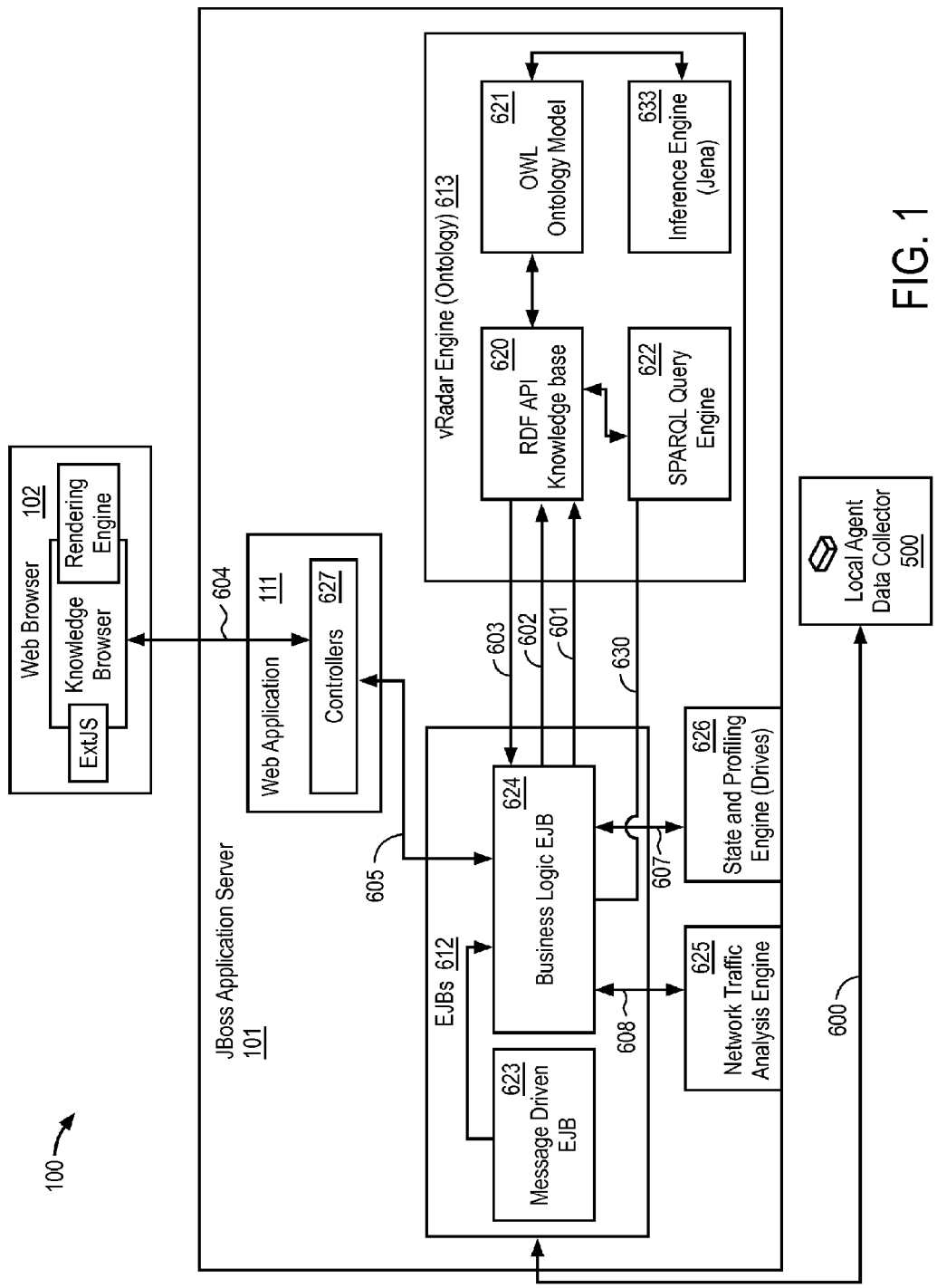
FIG. 1 is an illustrative embodiment of enterprise network including an administration console.

Embodiments of the invention provide systems and methods by which a user, such as a system administrator, may, once alerted to an error state or similar alert condition of a business application that executes on an enterprise network, be informed of the likely root cause of error state. Root causes may be direct root causes or indirect causes.

In one embodiment, an ontology for a business application that describes one or more nodes communicating with each other during the business application is generated and stored. When an alert condition of the business application is detected, the ontology is processed to determine one or more components of the ontology that are in an alert state. A root cause view that indicates the one or more alert state components may then be generated and displayed to a user.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention.

As used herein, the term "and/or" includes any and all combinations of one or more of the associated listed items. The symbol "/" is also used as a shorthand notation for "and/or".

In one embodiment, an enterprise IT infrastructure environment, including networks of computer entities consisting of physical and/or virtual machines located at network nodes, may be advantageously described via an ontology that describes the operational usage and current state of the entities rather than being based on a fixed IT infrastructure architecture. The ontological description may be automatically and dynamically updated based on data acquired from data collection agents deployed to the nodes of the network. The data collection agents observe communicative relationships based on connections between nodes in operational use, while annotating a class state. Using the ontological description, a network analyst or system operator may be provided with an improved ability to analyze network traffic.

Advantageously, data relating to actual connections may be acquired automatically in near real time. For example, an actual connection may be monitored in an interrupt-driven way while collecting information regarding an application that made the connection. Moreover a "volume for the connections" may be derived.

A software based data collection agent may be received by a computing device at a node within a communications network. The agent may be distributed to one or more nodes from a central node via the network. Once the software based data collection agent is received, it may be inserted in an operating system of the receiving node. Advantageously, the agent may be inserted in the kernel of the operating system or in a user space (i.e., an area in virtual memory of a computer that contains user applications that execute at the application layer). The installation may be such that it is transparent to, or undetected by a user of the node. The installed data collection agent may monitor data packet traffic between an adaptive driver layer and a protocol layer and report results of the monitoring to the central node.

In one example, the data collection agent may have an interface to an operating system's network stack and may periodically determine what applications are using the network stack. Thereby the data collection agent may track information regarding a network connection, the connection duration, and any applications and systems involved in the connection. Moreover, the data collection agent may normalize the foregoing information and report it to an administration console so that different operating systems may be correlated by the administration console.

As a further example, the data collection agent may include a network filter inserted into the network stack to determine exactly when a connection is made between entities. The filter component of the data collection agent may be inserted at one or more layers of the OSI model. For example a data collection agent may have filter interface at the transport layer and/or a filter interface at the network layer. Thereby, the data collection agent may track information regarding a network connection, the connection duration, and any applications and systems involved in the connection. Moreover, the data collection agent may normalize the foregoing information and report it to the administration console so that different operating systems may be correlated by the administration console.

As a yet further example, the data collection agent described in the preceding paragraph may also include a packet filter inserted into the network stack to track connection data. For example, a data collection agent may have a filter interface at the data link layer. Then, the data collection agent may correlate and normalize (if required) data from the network filter and the packet filter to track information regarding the network connection, the connection duration, any applications and systems involved in the connection, connection status and connection resource usage information. Moreover, the data collection agent may normalize the foregoing information and report it to the administration console so that different operating systems may be correlated by the administration console.

Referring now to FIG. 1, an illustrative system 100 for deploying data collection agents onto network nodes, monitoring network connections instantiated at each network node, acquiring resulting data, automatically creating an ontological description of the network from the acquired data; and dynamically updating the ontological description will be described. The system 100 may further be used for monitoring configuration drifts within an enterprise network as will be described in more detail below. In an embodiment, elements of system 100 utilize the Java software platform and Enterprise Java Bean (EJB) architecture to provide certain functionality, and these well-known terms may be used in the description that follows. Other software platforms and architectures, including Spring with Hibernate, Silverlight, or other similar technologies providing similar functionality may be used without departing from the scope of the present invention.

System 100 may comprise an application server 101, which interacts across a network with a number of data collection agents 500 deployed in various nodes of the network. Advantageously, application server 101, may be an element of an administrative console (AC) that also provides a suite of network management tools. A system administrator may perform network traffic analysis and/or other network management tasks by accessing application server 101 by way of web browser 102. Application server 101 may comprise an EJB module 612, an ontological description creation engine 613, and a web application 111.

Data collection agents 500, as described hereinabove, may be deployed onto network nodes including physical and/or virtual machines in an enterprise IT infrastructure environment. After such deployment, application server 101 receives messages from data collection agents 500. These messages may include data representing, for example, state and relationship information about the network nodes, configuration information related to the IT infrastructure, performance/utilization data and network communication.

The received messages may be initially handled by EJB module 612. For example, message driven EJB 623 may initially inspect a received message. A received message relating to network traffic or node status may be forwarded by message driven EJB 623 to the Business Logic EJB 624. Business Logic EJB 624 may call Network Traffic Analysis Engine 625 for messages relating to network traffic. Alternately, "infrastructure messages" (i.e., those relating to node status) may be forwarded directly to the State and Profiling Engine 626.

Messages forwarded to the state and profiling engine 626 may there undergo sorting and processing. The state and profiling engine 626, for example, may identify the entities within the IT Infrastructure as well as their dependency on one another, based on messages received from the platform. In addition, state and profiling engine 626 may perform further processing to determine the state of one or more entities. State may be based on a threshold that has been defined, for example, by the system administrator. The threshold may consist of a metric that either exceeds or underperforms in a specific area of interest to the system administrator. An example would be where a server in a network is exceeding a specified CPU utilization percentage.

A data output from state and profile engine 626 may be sent via signal flow paths 607 and 601 to ontological description creation engine 613. Initially, the data may be handled by Resource Description Framework (RDF) API knowledge base 620 where the data is categorized and stored utilizing a predefined entity relationship, determined by the Web Ontology Language (OWL) API 621. OWL is a family of knowledge representation languages for authoring ontologies which are a formal representation of the knowledge by a set of concepts within a domain and the relationships between those concepts. Ontologies are used to reason about the properties of that domain, and may be used to describe the domain.

Messages handled by the Network Traffic Analysis Engine 625 may include source-to-destination data, qualified by a communicating application within the operating system of the originating node, as well as frequency of communication information. This data is analyzed by processing the number and type of connections to determine if an Ontological "communicates_with" relationship exists. A determination may be made by tracking the number of connections of a specific application over a period of time. The period of time may be a system default time or may be preselected, for example, by the system administrator.

A data output from network traffic analysis engine 625 may be sent via signal flow paths 608 and 602 to ontological description creation engine 613. Initially, the data may be handled by RDF API Knowledge base 620 where the data is categorized and stored utilizing a predefined entity relationship, determined by OWL API 621. For example OWL API 621 may define what entity classes exist, their possible relationship to each other, and their possible state.

Figure 2:
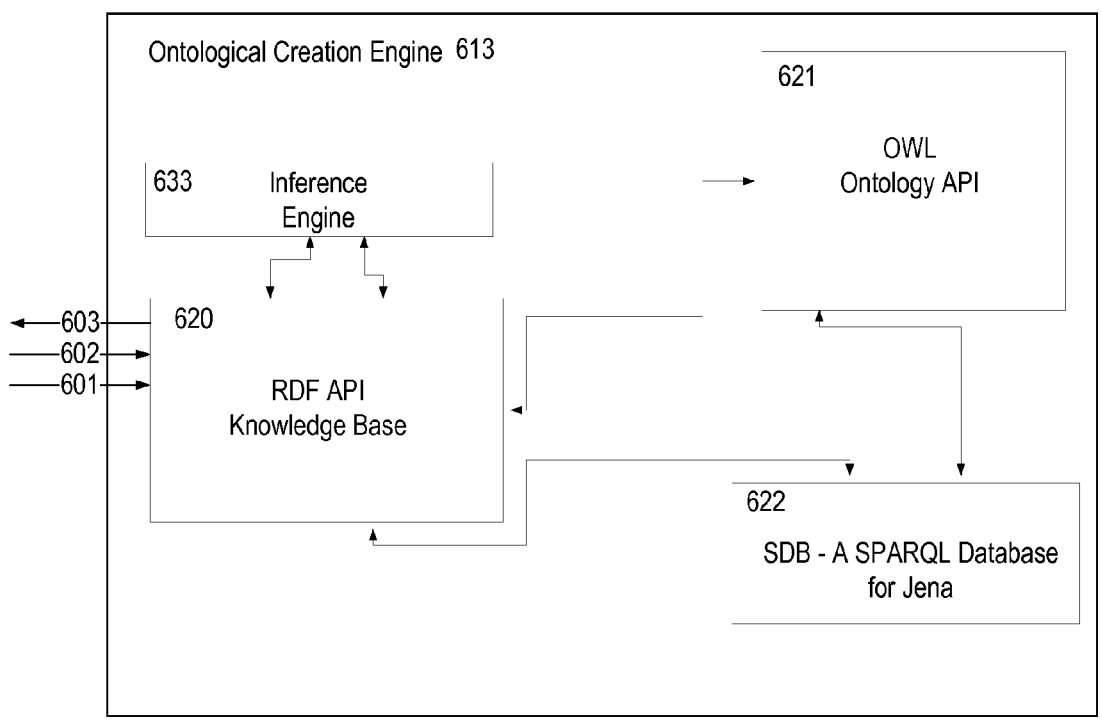
FIG. 2 is an illustrative embodiment of an ontological creation engine.

Referring now to FIG. 2, as data is received by RDF API Knowledge Base 620, logic in the RDF API Knowledge Base 620 may map the incoming data to the appropriate ontological classes and relationships defined by OWL Ontology API 621. Once the correct classes and relationships are chosen, the entity and relationship information may be entered into RDF API Knowledge Base 620. The knowledge base may also be forwarded to SPARQL database and query language SPARQL Database for Jena 622 for later inference processing by inference engine 633. Inference engine 633 may determine inferred relationships based on the ontology model contained in OWL Ontology API 621. SPARQL is an Resource Description Framework (RDF) query language. Its name is a recursive acronym that stands for SPARQL Protocol and RDF Query Language. It was standardized by the RDF Data Access Working Group (DAWG) of the World Wide Web Consortium, and is considered a key semantic web technology. Jena is a Java framework for building Semantic Web applications. It provides a programmatic environment for RDF, RDF Schema (RDFS) and OWL, SPARQL and includes a rule-based inference engine.

The above described agent based system and ontological network description may provide the basis for a system and method that allows the root cause of errors and failures to be determined.

Figure 3:
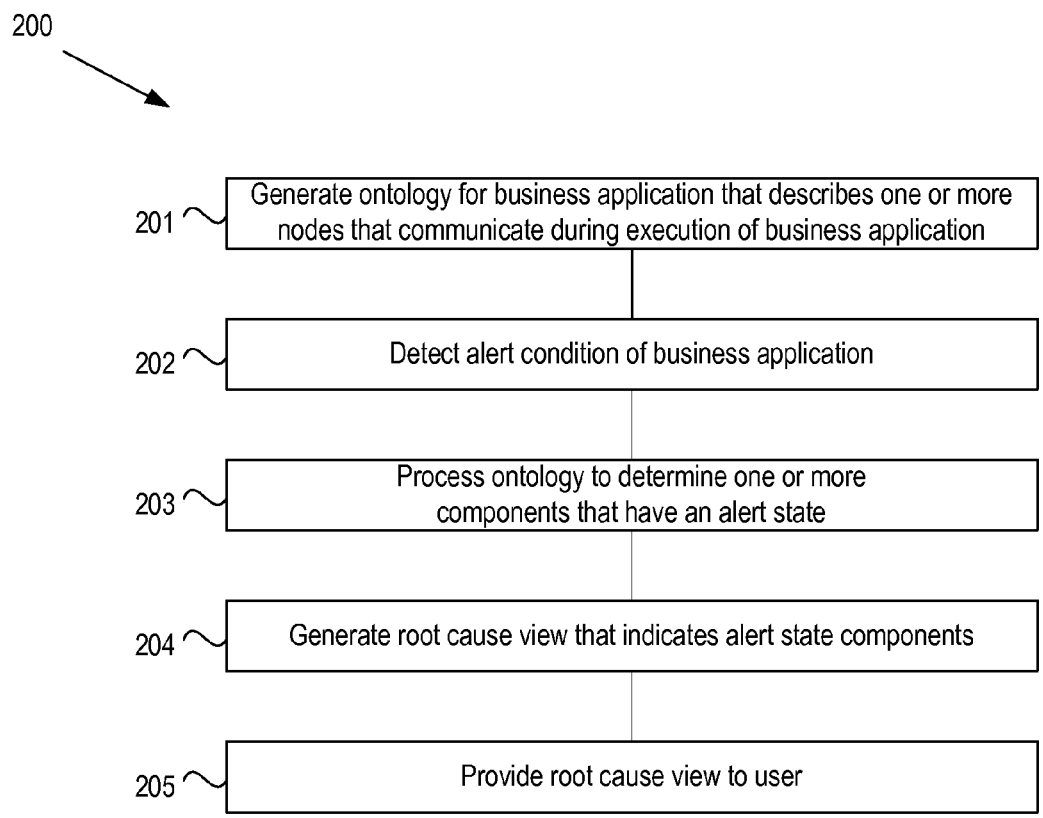
FIG. 3 depicts a flow diagram of one embodiment of a method for determining root cause.

FIG. 3 depicts a flow diagram of one embodiment of a method for determining root cause. The method of FIG. 3 is performed by processing logic that may comprise hardware (circuitry, dedicated logic, etc.), software (such as is run on a general purpose computer system or a dedicated machine), or a combination of both.

Referring to FIG. 3, at block 201, an ontology for the business application is generated that describes one or more nodes that communicate with each other during the business application. At block 202, an alert condition of the business application is detected. In response to the alert detection, the ontology is processed to determine one or more components of the ontology that are in an alert state (block 203). A root cause view is then generated that indicates the one or more alert state components (block 204), which is then displayed to a user (block 205), such as a system administrator. The system administrator is then able to take the necessary remedial action to correct the fault.

Root Cause may be defined as the identification of specific nodes that have contributed to the overall failure of a Business Application Service. Failure may be defined as a "State" of the Business Application Service meeting a threshold requirement. The failure may be indicated by a parameter exceeding a threshold value, e.g. a "High Error", such as excess CPU usage, excess response time, etc. The failure may be indicated by a parameter falling below the threshold level, e.g. a "Low Error" such as a Service Tier Threshold, a communication bit rate, etc.

Business Application Services will typically be performed by nodes and members of a Service Group. Service Groups may be defined as Business Application service groups by a user utilizing the automatically gathered data by the system. Service Groups may also be defined manually by a user, such as the network administrator.

A Business Application Service may be defined for many services that provide a primary application to a business enterprise. An example of this would be an Enterprise Infrastructure that provides e-mail services to its users. The Business Application Service to provide "e-mail" may be a service group comprised of a Physical host, Virtual Machines, Disk, Network, and Primary Applications. Changes to one or more of these elements may include a combination of the following; CPU usage, memory, storage capacity utilized, network uptime, configuration drift, and/or alerts or alarms from the network and infrastructure providers. Any of these changes could lead to a failure or error state for the Business Application Service.

Figure 4:
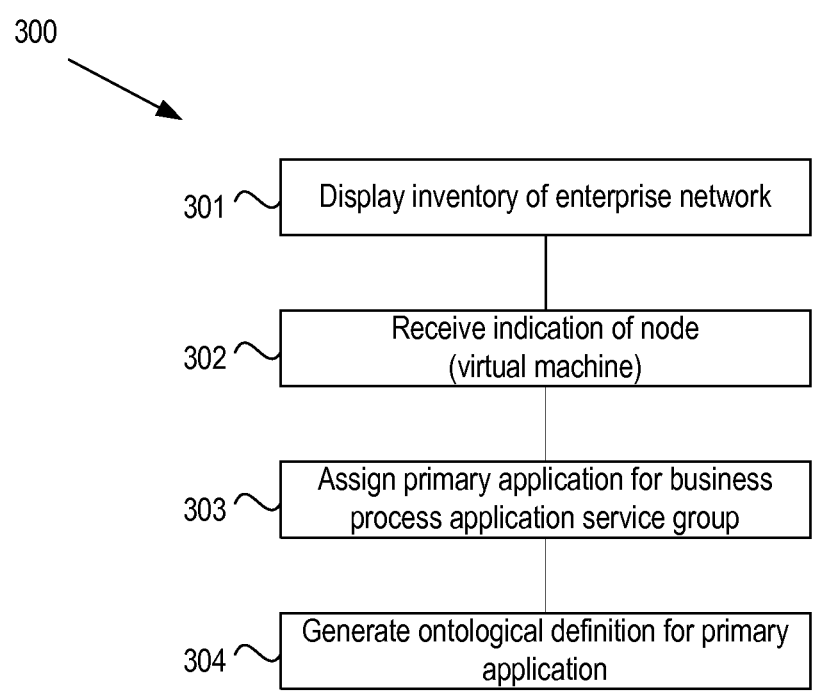
FIG. 4 depicts a flow diagram of one embodiment of a method for defining a primary application.

One embodiment of a method for categorizing a Business Process Application Service Group will now be described with reference to FIG. 4. The method of FIG. 4 is performed by processing logic that may comprise hardware (circuitry, dedicated logic, etc.), software (such as is run on a general purpose computer system or a dedicated machine), or a combination of both.

Once agents are installed, application communications are tracked. Information is collected and analyzed by the network traffic engine including the application making the connection, number of connections, connection duration, connection status, connection resource usage information and the systems involved in the conversation. Referring to FIG. 4, through the web application 111, a user such as a system administrator may be provided with a view of an inventory of the enterprise network (block 301). The inventory may list all of the nodes of the network, as determined by the agent processes described above. Using the inventory interface, the user is allowed to indicate a node, such as a virtual machine block 302). The Administrative Console's User Interface (within an Inventory View, for example) provides the user with an ability to indicate the node.

Figure 5:
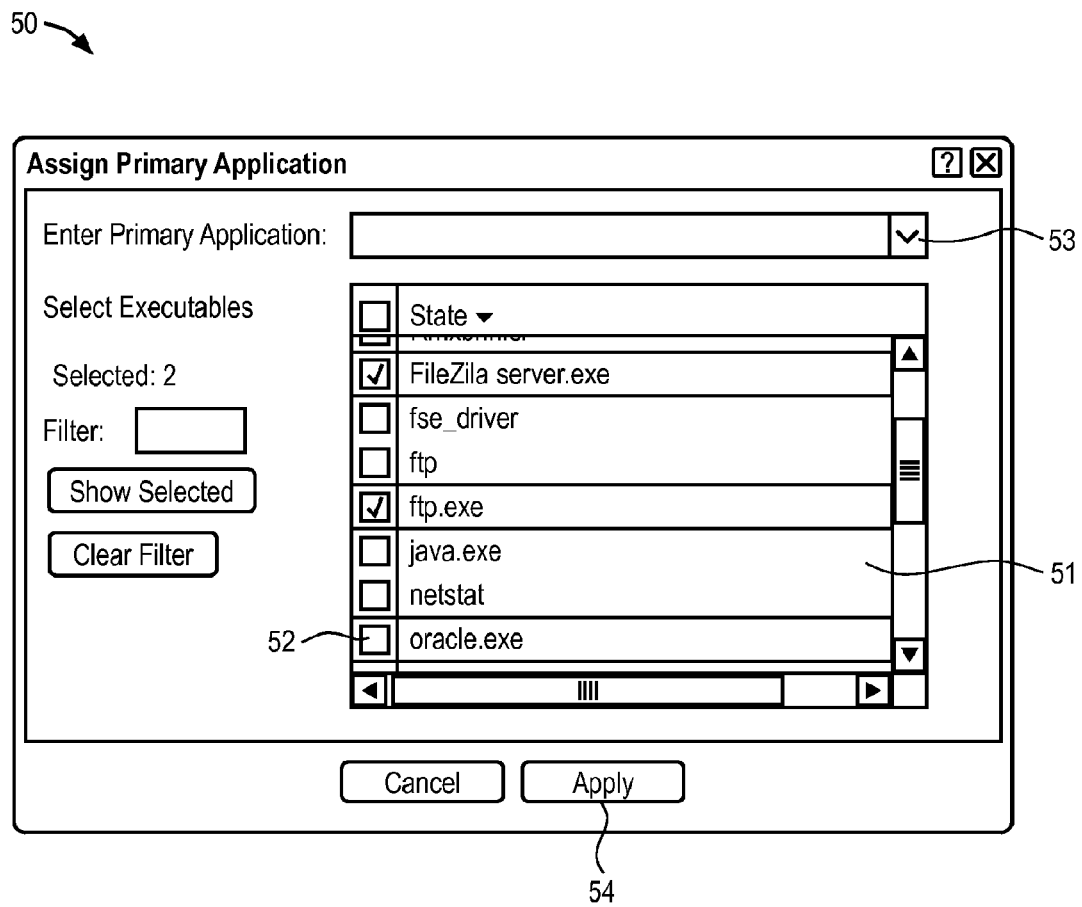
FIG. 5 depicts an interface for defining a primary application according to an embodiment.

An assign primary application function may then be selected for the selected nodes (block 303). An exemplary interface 50 for assigning the primary function in accordance with an embodiment is shown in FIG. 5. The interface 50 lists the executables 51 available for the selected virtual machine. These executables are the files that are executed to perform the tasks required for the business process. The user may define the primary application by selecting checkboxes 52 associated with each executable. Alternatively, the user may select a primary application from a drop-down menu 53, which causes a default list of executables to be selected. By selecting an assign icon 54, the user is able to assign the primary application, including the selected executables, to the virtual machine.

Once the primary application has been indicated by the user, the primary application may be treated as a "node" by the RDF Knowledge base 620. That is, using the agent processes described above, an ontology may be created for the primary application by analyzing the components of the network which have "communicates_with" relationships with the defined executables of the primary application. This ontology may be generated and stored in the RDF Knowledge base as a categorized Business Process Application Service Group (block 304). Once the Ontology for a Business Application Service Group has been created and added to the RDF Knowledge Base 620, the Business Process Application Service Group may be used as a baseline for the automatic detection of similar but uncategorized service groups within the network ontology.

Defining a primary application and then determining an ontology for the primary application is one way in which a business process application service group may be defined. Other methods will be apparent to a person skilled in the art. In one alternative example, an interface may be provided that allows a user to build the baseline on a blank template, adding the components that are required to perform the functions of the service group.

Because the primary application and the Business Application Service Group are treated as nodes of the network ontology, they can be assigned a state. In one embodiment, the state of a Business Application Service Group may be determined by combining the states of the components of the service group. The state of a primary application may be determined by monitoring the executables and service communication and performance on the nodes that execute the executables.

Detection of failures of a business application service may be performed by monitoring the health of the components of the service group that performs the business application service as well as the connections between these components. There are several factors that contribute to the overall health or "state" of the Business Application Service. Parameters such as CPU usage, memory, network uptime etc are all indicators of the state of the business application. If the primary application's components (Executable application and/or Services) are unable to communicate or perform within acceptable parameters it can greatly affect the performance of the Business Application Service. The system may thus be used to monitor the state of the Primary Applications by monitoring the executables and service communication and performance on the nodes themselves.

State may be defined as an entity (whether virtual or physical) associated with a node. Any node may have a "state" established by, for example, detection of a physical condition of the node at a discrete moment in time. The state may be established, for example, on the basis of assigning a threshold value for a particular parameter, followed by monitoring the parameter for any changes. Example parameters may include, without limitation, CPU usage, memory or storage capacity utilized, network uptime, configuration drift, and/or alerts or alarms from the network.

If the state of the business application service indicates a high error or failure relative to a Business Application's current state, an analysis can then be undertaken to determine the node or nodes at the root cause of the error state.

One embodiment of a method for determining root cause of a failure will now be described with reference to FIG. 6. The method of FIG. 6 is performed by processing logic that may comprise hardware (circuitry, dedicated logic, etc.), software (such as is run on a general purpose computer system or a dedicated machine), or a combination of both.

Figure 6:
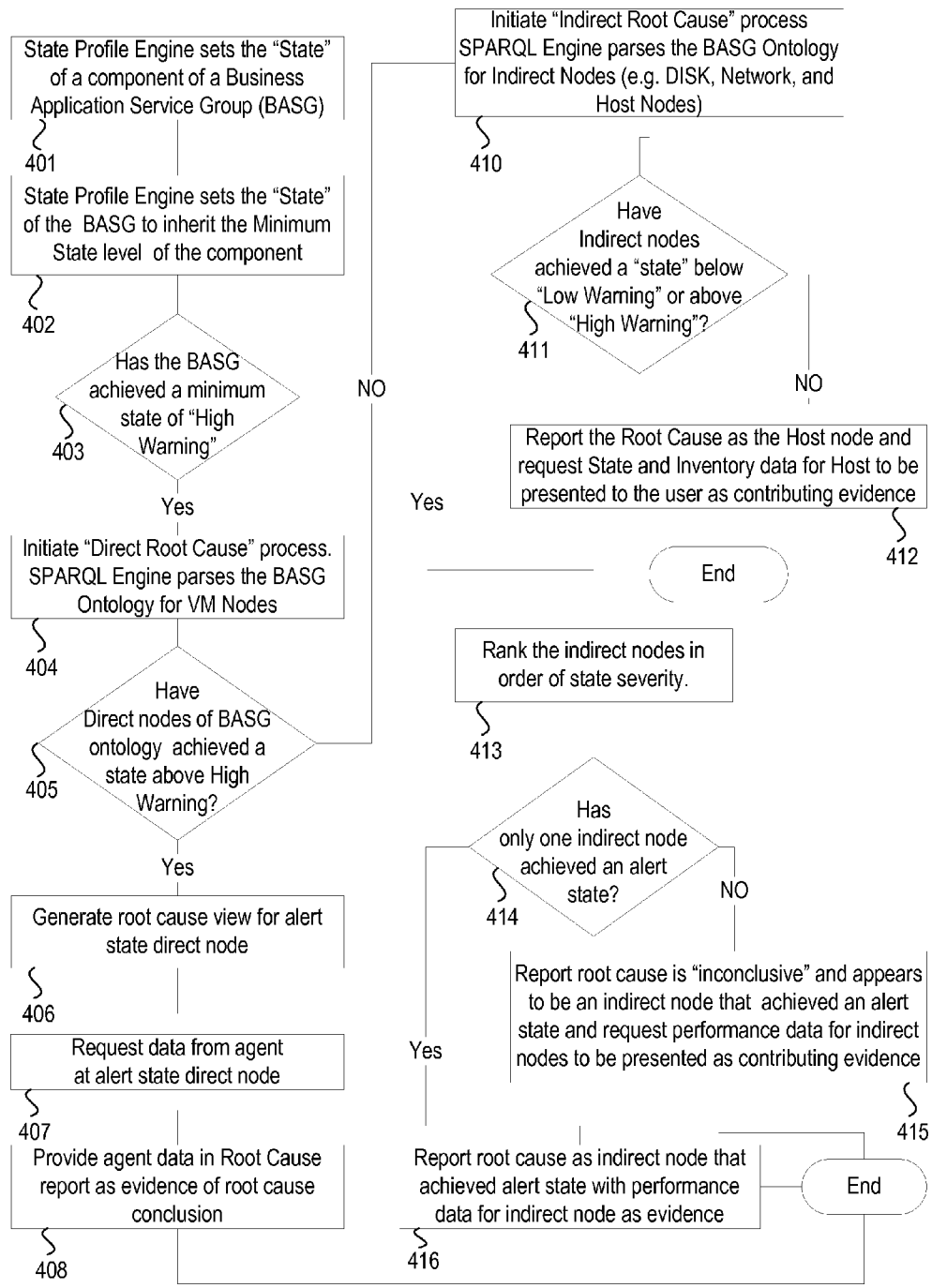
FIG. 6 depicts a flow diagram of one embodiment of a detailed method for determining root cause including direct and indirect root causes.

Referring to FIG. 6, at block 401, agent data is used to determine, by the State and Profiling Engine, the states of components of a business application service group, including states of the executables, states of the virtual machines that execute the executables and states of the support nodes. In one embodiment, the states of the components may be determined by initiating a query to the SQARQL Engine 622 to gather all the class, object properties, and data values from the knowledge base 620 for a given Business Application Service Group. The SQARQL 622 engine simultaneously initiates a query for current performance threshold data in the database. The components states are determined because they have thresholds to achieve, over achieve, or under achieve. Nodes, executables and the business application service groups may also incorporate status and alerts from Infrastructure providers. The Executables have state as it relates to the communicates_with relationship. For example, if an executable such as sqlservr.exe no longer communicates with node X, it is Critical High and indicated on the user interfaces as red. This is true of a node that represents a "Communicates_with" relationship as well as a Primary Application represented as a node.

At block 402, the state and profiling engine 626 sets the state of the business application service group using the agent data and system information. When any component of the BASG has achieved a "High Warning" state, the user sees the component as Red (indicating high warning) as well as the BASG as Red.

In one embodiment, the business application service group inherits the highest level warning state from the components of the group, though other methods for aggregating the states of the components may be employed, including providing weightings to the states of the different components. If the business application service group has a state of "high warning" or some similar alert state, as determined at block 403, then a "direct" root cause process is initiated (block 404) in which the business application service group ontology is parsed by the SPARQL engine 622 for direct relationship nodes. Direct nodes for the business application service group ontology are those nodes that directly execute the executables of the primary application(s) of the business application. Typically, direct nodes will be virtual or physical machines. The RDF Knowledge Base processes the ontology of the business application service group to determine if any of the direct nodes have achieved a state above High Warning (decision block 405). If so, then the alert state VM is reported as the root cause (block 406). A request for performance data may be sent to the agent on the faulty VM (block 407). Data received from the agent may then be presented in the root cause report as contributing evidence for the root cause conclusion (block 408).

If no VM is in an alert state as determined at decision block 405, then an indirect root cause process is initiated (block 409) in which the BASG ontology is parsed for Indirect nodes, such as DISK, network and host nodes that provide indirect support to the direct nodes that execute the executables of the business application. Indirect nodes may be defined as nodes that provide a resource allocation to a direct node such as storage through the physical host or network device nodes that provide access to a Virtual Machine via the physical Host's provided network connectivity. In some cases, a virtual or physical machine may also be considered as an indirect node. For example, where Virtual Machine "A" has a communicates_with Relationship with Virtual Machine or Physical Machine "B" and the Virtual Machine or Physical Machine "B" has a dependency on processing, or data stored on a Virtual Machine "C", and Virtual Machine "B" relies on this dependency to carryout its contribution to the Business Application Service process, then Virtual Machine C would be considered an indirect node.

At block 410, an indirect root cause process is initiated by the SPARQL Engine and the SPARQL engine 622 queries whether any Indirect nodes such as nodes that provide DISK or Network to the business application service group have achieved an alert state such as a state below "Low Warning" or above "High Warning" (decision block 411). If not, then the system reports the root cause as the Host node and requests State and Inventory data from the Agent via the Business Logic EJB Factory be presented to the user as contributing evidence for the conclusion (block 412). If decision block 410 is positive, i.e. one or more DISK or Network nodes have achieved a "state" below "Low Warning" or above "High Warning", then the SPARQL engine 622 ranks the DISK and Network nodes in order of state severity (block 413). If there is more than one Disk or Network node that achieved a "state" below "Low Warning" or above "High Warning" (decision block 414) then the root cause is reported as "inconclusive" and appears to be one of the Disk or Network node that achieved a "state" below "Low Warning" or above "High Warning" (block 415). Performance data is requested from the relevant Agents via the Business Logic EJB Factory to be presented to the user as contributing evidence for the conclusion. If decision block 413 shows only one node that has achieved a "state" below "Low Warning" or above "High Warning", then the system can conclusively report the root cause as the Disk or Network node that achieved a "state" below "Low Warning" or above "High Warning" (block 416). Performance data for this node can be added as contributing evidence.

The Business Process Application Service Group may be monitored for its State as an aggregate unit of the individual components by utilizing the "state" function within the State and Profiling Engine 626. The system monitors for a change in the overall state of the Business Application Service by monitoring the EJB Messages that are sent to the State and Profiling Engine by the agents that report the performance of the nodes.

The State and Profiling Engine 626 provides a state for each individual element of the Business Application Service group. The process to determine state of an individual element may be based on a threshold that has been defined, for example, by the system administrator. The threshold may consist of a metric that either exceeds or underperforms in a specific area of interest to the system administrator. An example would be where a server in a network is exceeding a specified CPU utilization percentage.

The states of the individual Business Application Service components may be aggregated to calculate an overall state for the Business Application Service group. Any support nodes within the BASG Ontology that has achieved a High Warning rolls up to the BASG as a High Warning. If any one nodes with a communicates_with relationship achieve a High Warning it rolls up as a High Warning for the BASG. High Errors may roll up the same way. In one embodiment, in order for a node to achieve these states, the states must have been observed and processed by the State and Profiling Engine three times within one hour. Thus, spurious errors and faults will not lead to warnings being generated for the overall business application process.

One embodiment of a method for processing state information of elements of a business process ontology and more specifically for a business application service group that is in an error state will now be described with reference to the flowchart 700 of FIG. 7. The method of FIG. 7 is performed by processing logic that may comprise hardware (circuitry, dedicated logic, etc.), software (such as is run on a general purpose computer system or a dedicated machine), or a combination of both.

Figure 7:
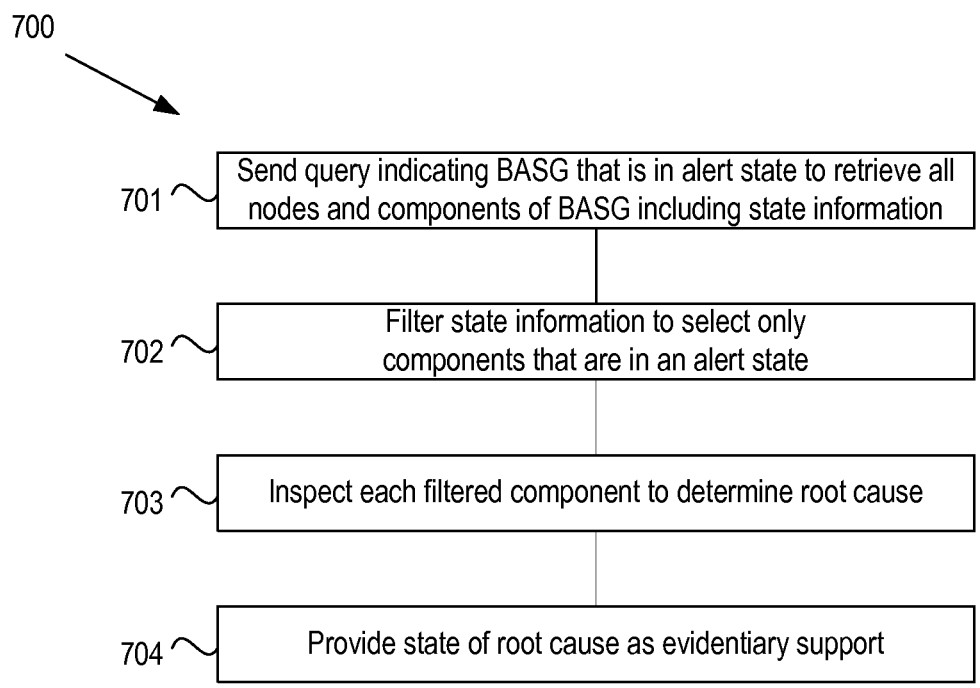
FIG. 7 depicts a flow diagram of one embodiment of a method for processing state information of elements of a business process ontology.

Referring to FIG. 7, at block 701, a query is sent to the RDF Knowledgebase 620 that identifies the Business Application Service Group that is in an error state. The RDF Knowledge Base 620 returns the list of components of the Business Application Service Group (hardware nodes, virtual nodes, executables, primary applications, etc) and their state. It should be noted that the Primary Application of the Business Application Service Group is considered by the RDF Knowledge base to be a "node". At block 702, a filter is applied to determine those components that may have contributed to the "High Warning" Threshold. In one embodiment, the filter omits any individual component that has not exceeded a "High Warning" threshold individually from the process.

At block 703, the process continues by inspecting each of the components. The inspection process looks up performance data previously reported by the agents deployed to the nodes. The inspection process thus yields all of the component's relevant data for determining root cause. In one embodiment, the Data used for this determination is Service Tier data; CPU, Memory, Disk, and Network Threshold roll up data (last 30 days), though other relevant data may also be used.

The root cause process may also use Virtualization Infrastructure Alarms and Network Status updates. These are available to the system for Host, Virtual Machines, Disks, and Network devices, and may be sent in messages from the proxy agent 600. The Proxy Agent contains an instruction for translating Virtual Infrastructure messages to a format that the State and Profile Engine 626 can process. If for example the Proxy Agent receives a message from the Virtual Infrastructure stating a DISK has achieved full Capacity and has an error level of 3, the Proxy Agent will modify the received message with a translation on the "level of 3" to "High Error". This is then sent to the Message Driven Bean Factory 623, where an EJB is created with the contents received from the Proxy Agent 600. The Business logic then routes the new State EJB to the State and Profiling Engine data for the Executables. This is provided to the user as support evidence for the Root Cause Conclusion.

The SPARQL Engine 622 determines the state of the Primary Applications and the contributing executables that make up the Primary Application by requesting the Ontology for the Business Application Service. The Ontology is analyzed for breaks in communication with nodes, as described in the Applicant's co-pending applications referenced above.

The SPARQL Engine 622 will send a request to the Agent 600 to send back the performance statistics of the Executables that make up the Primary Application of the Business Application Service. This will provide the user with the real-time performance statistics of the executables to provide support for a conclusion of a Root Cause of failure is due to the failure of the Primary Application support nodes (block 704).

In one embodiment, a support node may be defined to mean a node that provides either a direct or indirect role in the execution of a Primary Application. For example, if a Virtual Machine has Executables that execute on it, and that Executable Application communicates with other nodes in the Business Application Service group, then a direct relationship exists between the Virtual Machine and the other node that the Executable Application is communicating with. Other nodes such as DISKs or datastores provide support to the Virtual Machine as do Network Devices, and may thus be considered to have an indirect relationship. If these devices fail, then the Virtual Machine may be degraded or fail. The system will provide a Root Causes conclusion where a direct relationship exists with a Primary Application. The system will also provide the user the evidence to consider if multiple in-direct nodes have failures. If only a single in-direct node has achieved a failure the system will conclude it is the Root Cause of the failure.

The System will further provide the user with the real-time performance statistics of the executables to provide support for a conclusion that a Root Cause of failure is due to the failure of the Primary Application support nodes.

Figure 8:
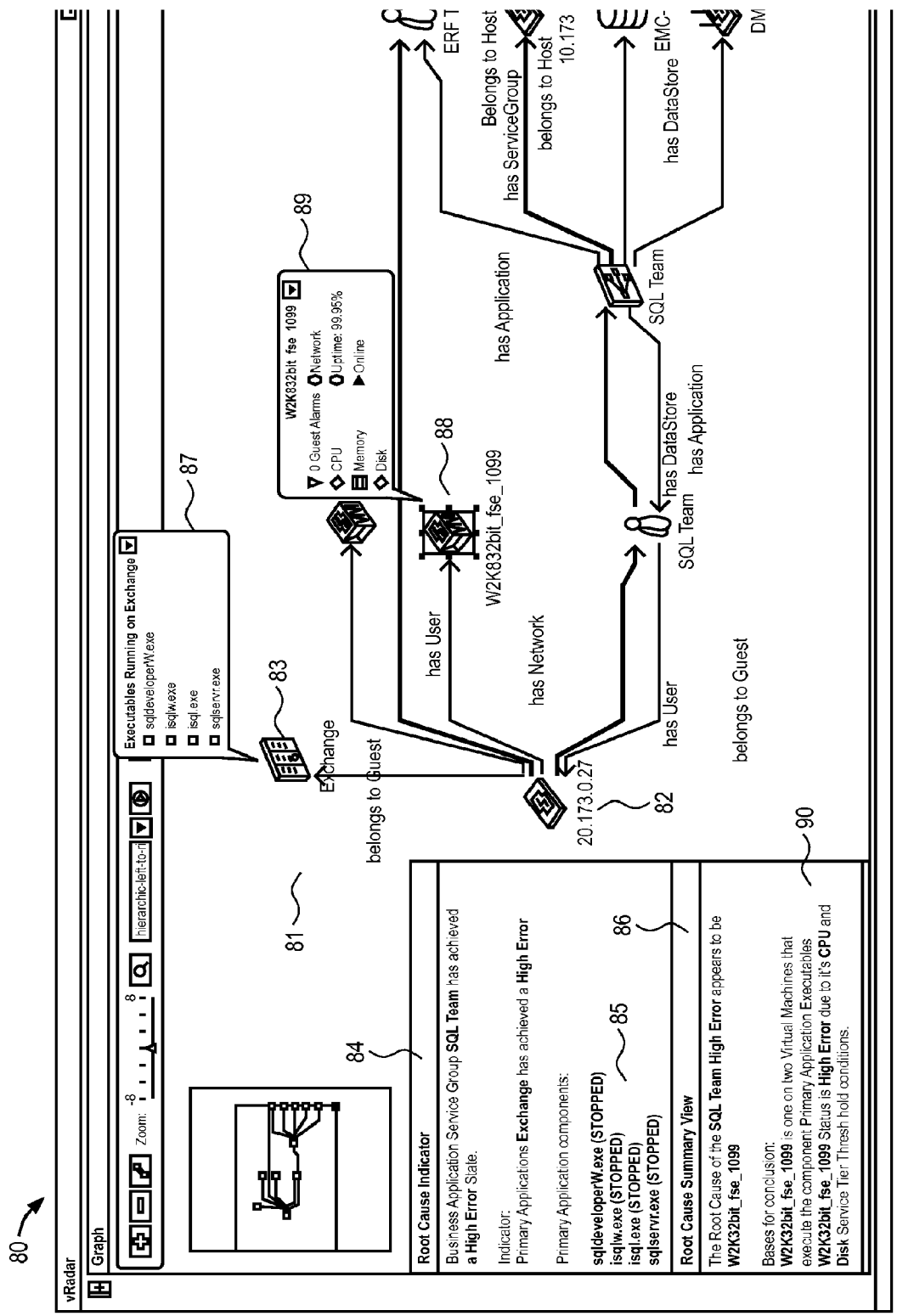
FIG. 8 depicts a root cause view according to an embodiment.

The root cause may be indicated on an interface 80 as indicated in FIG. 8. The interface displays an ontology 81 for the Business Application Service Group. In this example, the Business Application Service Group is called "SQL Team". The Business Application Service Group has a host 82 titled "10.173.0.27" which executes a primary application 83 titled "Exchange". At this specific instance of the example, Business Application Service Group is in an error state. A Root Cause window 84 indicates that the primary application "Exchange" has stopped is in High Error. The root cause window lists the executables 85 for the primary application, and indicates that these executables have stopped. The state of the executables would have initially been detected by the State and Profiling Engine 626 receiving agent reports from the "Exchange" node that the executables had stopped running. This error state for the executables would have created a corresponding error state for the primary application "Exchange" and, in turn, a high error state for the entire Business Application Service Group "SQL Team", thus triggering the root cause process.

As described above, the root cause process analyzes the components of the primary application. These are listed 85, with their state, in the root cause window 84. The primary application components are also listed in a separate window 87 stemming from the "Exchange" node 83 in the Ontology view 81.

The root cause analysis further analyzes all of the components of the ontology that performs the Business Application Service Group. In this example, the ontology includes the Virtual Machine 88 titled "W2K832bit_fse_1099". Parameters for this virtual machine, retrieved by the State and Profiling Engine 626, indicate that the CPU and Disk of this VM have exceeded their Service Tier Threshold. The Root Cause process therefore determines that these parameters are the root cause of the Business Application Service Group achieving its error state. The parameter states for the VM 88 are therefore displayed in a parameter state window 89 stemming from the VM node 88. In addition, a root cause summary window 90 describes the root cause of the high error state of the "SQL Team" Business Application Service Group as being due to the VM 88. The summary window 86 further includes a basis for conclusion summary 90, which indicates the parameters of the VM 88 that are in an error state.

In one embodiment, the data collection agent may include a profile of anticipated application network connections for the network node, and the data collection agent may determine a state of the network node by comparing actual network connections to the profile. The state may be annotated in a visual representation of the ontological description. Moreover, a weighting factor may be applied to the state to facilitate subsequent analysis by the system for alarming and alerting.

An advantage of the above root cause determining processes includes the ability to determine direct and indirect root causes as well as provide evidence to substantiate the automatic root cause findings. A user, such as a system administrator, is thus able to quickly take the appropriate remedial action to alleviate the alert condition. In particular, if a cause is an indirect cause, the user can take the action on the indirect node, rather than attempting to fix a direct node that is reporting an error state due to the indirect node.

Figure 9:
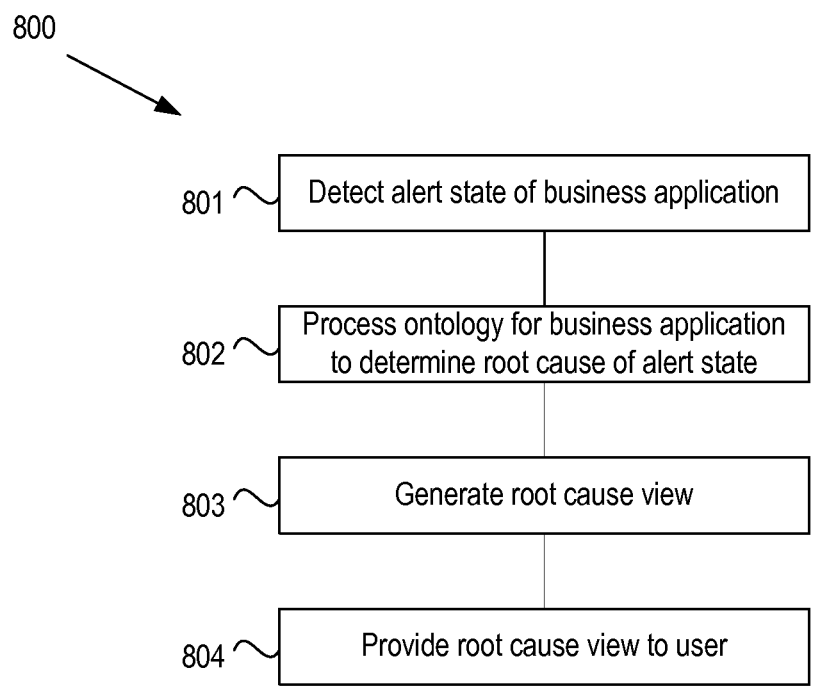
FIG. 9 depicts a flow diagram of one embodiment of a method for providing a root cause view.

FIG. 9 is a flow diagram of one embodiment of a method for providing a root cause view. The method of FIG. 9 is performed by processing logic that may comprise hardware (circuitry, dedicated logic, etc.), software (such as is run on a general purpose computer system or a dedicated machine), or a combination of both. In one embodiment the method of FIG. 9 is performed by an administration module.

Referring to FIG. 9, at block 801, an alert state of an executable of a business application is detected. At block 802, an ontology of the business application is processed to determine a root cause of the alert state. At block 803, a root cause view is generated to indicate the root cause of the alert state. At block 804, the root cause view is provided to a user.

Figure 10:
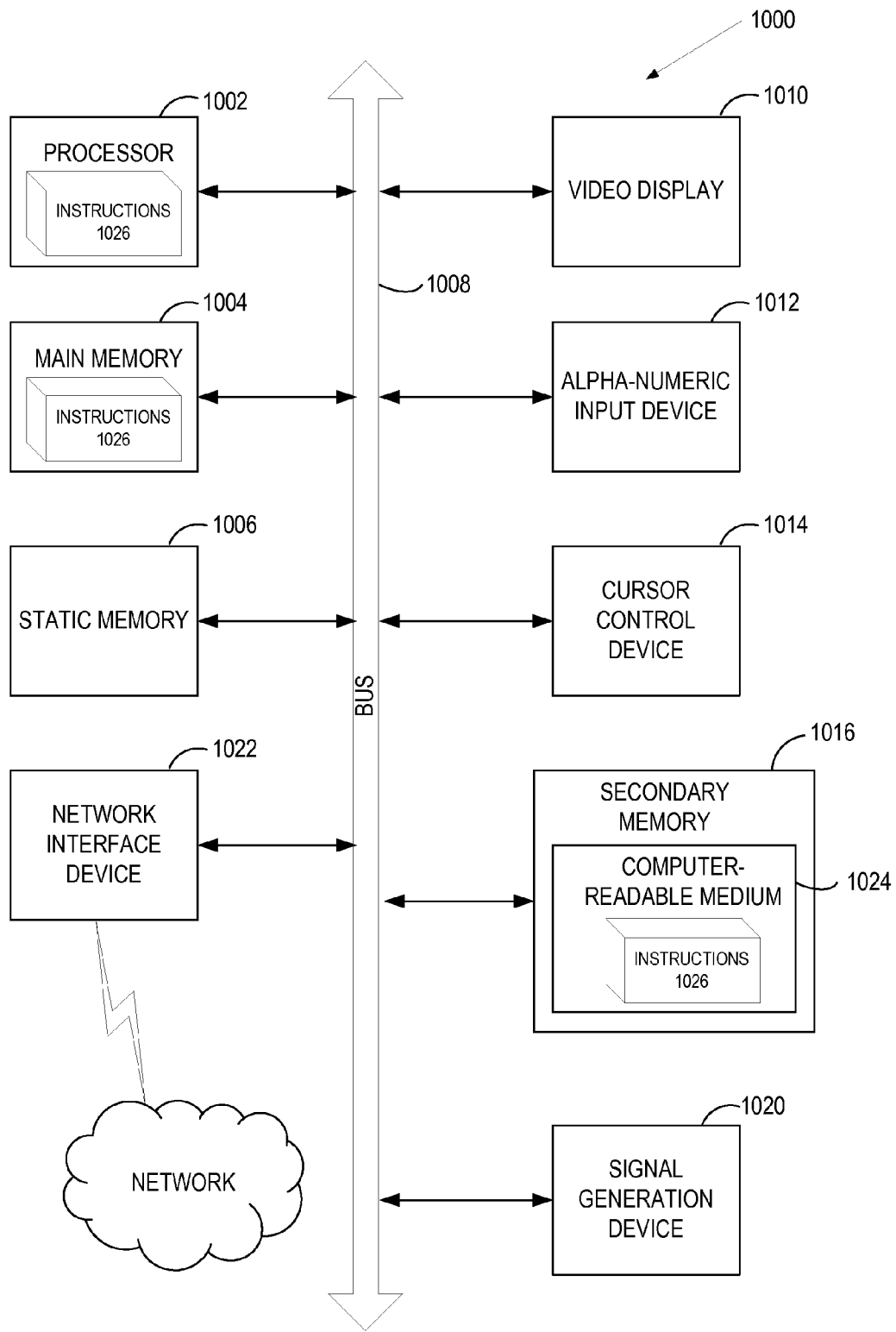
FIG. 10 is a block diagram of an exemplary computer system that may perform one or more of the operations described herein.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1016 (e.g., a data storage device), which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The secondary memory 1016 may include a machine-readable storage medium (or more specifically a computer-readable storage medium) 1024 on which is stored one or more sets of instructions 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

The machine-readable storage medium 1024 may also be used to store software performing the operations discussed herein, and/or a software library containing methods that call this software. While the machine-readable storage medium 1024 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "encrypting", "decrypting", "sending" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
   upon detecting an alert condition during an execution of a business application, analyzing an ontology of the business application to identify one or more of a plurality of components of the ontology that are in an alert state, the plurality of components comprising one or more executables associated with the business application, one or more direct nodes executing the one or more executables and one or more indirect nodes involved in the execution of the business application; and
   providing a user interface that indicates the identified components in the alert state.

2. The method of claim 1 further comprising:
   retrieving performance data for the identified components in the alert state; and
   indicating the performance data for the identified components in the user interface.

3. The method of claim 1 wherein the user interface comprises a root cause view graphically depicting the ontology of the business application.

4. The method of claim 3 wherein:
   analyzing the ontology comprises determining one or more direct nodes of the ontology that are in the alert state; and
   indicating one or more direct nodes that are in the alert state as a root cause of an error state of the business application.

5. The method of claim 4 further comprising indicating the alert state of the one or more direct nodes in the root cause view.

6. The method of claim 4 further comprising:
   if no direct nodes are in the alert state, processing the ontology to determine one or more indirect nodes that are in the alert state; and
   indicating one or more indirect nodes that are in the alert state as the root cause of an error state of the business application.

7. The method of claim 6 wherein the one or more indirect nodes comprise one or more of a disk or a network node.

8. The method of claim 6 further comprising indicating a state of the one or more indirect nodes in the root cause view.

9. The method of claim 1 wherein analyzing the ontology of the business application comprises:
   defining one or more executables of the business application;
   determining nodes that have a communicates_with relationship with each other during execution of the one or more executables.

10. The method of claim 9 wherein the communicates_with relationship comprises a source-to-destination communication relationship.

11. The method of claim 1 wherein analyzing the ontology of the business application comprises determining an error state of one or more executables of the business application.

12. A system comprising:
   a memory to store an ontology of a business application, the ontology describing nodes of an enterprise network that communicate with each other during an execution of the business application;
   a processing device, coupled to the memory, to:
      analyze, upon detecting an alert condition during the execution of the business application, the ontology of the business application to identify one or more of a plurality of components of the ontology that are in an alert state, the plurality of components comprising one or more executables associated with the business applications, one or more direct nodes executing the one or more executables and one or more indirect nodes involved in the execution of the business application; and
      provide a user interface indicating the one or more alert state components to a user.

13. The system of claim 12 wherein the processing device is further to:
   execute a direct root cause process to identify a direct root cause; and
   if no direct root cause is identified, execute an indirect root cause process to identify an indirect root cause.

14. The system of claim 13 wherein the indirect root cause process determines one or more error states on one or more indirect nodes of the business application as described by the ontology of the business application.

15. The system of claim 14 wherein the ontology describes one or more executables of the business application and wherein the memory stores a state of the one or more executables.

16. The system of claim 15 wherein the ontology comprises nodes that have a source-to-destination relationship during execution of the one or more executables.

17. The system of claim 15 wherein the processor is further to:
   determine state information for one or more nodes of the ontology that are determined to be a root cause of an error in the business application; and
   indicate the state information in the user interface.

18. A computer-readable medium comprising computer-executable instructions for execution by at least one processing device, that, when executed, cause the at least one processing device to perform a method comprising:
   upon detecting an alert condition during an execution of a business application, analyzing an ontology of the business application to identify one or more of a plurality of components of the ontology that are in an alert state, the plurality of components comprising one or more executables associated with the business application, one or more direct nodes executing the one or more executables and one or more indirect nodes involved in the execution of the business application; and
   providing a user interface that indicates the identified components in the alert state.

19. The computer-readable medium of claim 18 wherein analyzing the ontology comprises determining one or more direct nodes of the ontology that are in the alert state, the one or more direct nodes that are in the alert state to be indicated in the user interface as a root cause of an error state of the business application.

20. The computer-readable medium of claim 19 wherein analyzing the ontology further comprises:
   if no direct nodes are in the alert state, processing the ontology to determine one or more indirect nodes that are in the alert state; and
   indicating one or more indirect nodes that are in the alert state as the root cause of an error state of the business application.

21. The computer-readable medium of claim 20 wherein the one or more indirect nodes comprise one or more of a disk or a network node.

22. The computer-readable medium of claim 18 wherein analyzing the ontology of the business application comprises:
   defining one or more executables of the business application;
   determining nodes that have a communicates_with relationship with each other during execution of the one or more executables.

* * * * *